United States Patent [19]

Winebaum

[11] Patent Number: 4,817,135
[45] Date of Patent: Mar. 28, 1989

[54] CRT MASS-DISTRIBUTION, PREPROGRAMMED AUTOMATIC DIALING MECHANISM AND RELATED PROCESSES

[75] Inventor: Jacob J. Winebaum, Washington, D.C.

[73] Assignee: U.S. News Limited Partnership, Washington, D.C.

[21] Appl. No.: 124,579

[22] Filed: Nov. 24, 1987

[51] Int. Cl.⁴ ............................................. H04M 1/26
[52] U.S. Cl. ..................................... 379/355; 379/216
[58] Field of Search ............... 379/354, 355, 356, 357, 379/216, 444

[56] References Cited

U.S. PATENT DOCUMENTS

| | | |
|---|---|---|
| 3,484,560 | 12/1969 | Jaeger, Jr. et al. |
| 3,701,946 | 10/1972 | Anderson |
| 3,806,874 | 4/1974 | Ehrat |
| 3,823,308 | 7/1974 | Goldberg |
| 3,859,634 | 1/1975 | Perron et al. |
| 3,872,435 | 3/1975 | Cestaro |
| 3,911,204 | 10/1975 | Spinelli ................................. 178/5.6 |
| 3,934,122 | 1/1976 | Riccitelli |
| 3,976,840 | 8/1976 | Cleveland et al. |
| 4,011,414 | 3/1977 | Warren |
| 4,011,417 | 3/1977 | Kageyama et al. |
| 4,054,756 | 10/1977 | Comella et al. |
| 4,071,697 | 1/1978 | Bushnell et al. ....................... 379/88 |
| 4,103,115 | 7/1978 | Milkes ................................. 379/443 |
| 4,107,467 | 8/1978 | Johnson et al. ....................... 379/99 |
| 4,117,542 | 9/1978 | Klausner et al. |
| 4,126,768 | 11/1978 | Grenzow .............................. 379/357 |
| 4,130,738 | 12/1978 | Sandstedt ............................. 379/361 |
| 4,203,006 | 5/1980 | Mascia ................................ 379/443 |
| 4,337,377 | 6/1982 | Van Riper et al. ................... 379/444 |
| 4,431,870 | 2/1984 | May et al. ............................ 379/396 |
| 4,451,701 | 5/1984 | Bendig ................................ 379/96 |
| 4,456,925 | 6/1984 | Skerlos et al. ........................ 358/85 |
| 4,490,579 | 12/1984 | Godoshian .......................... 379/354 |
| 4,535,204 | 8/1985 | Hughes et al. ....................... 379/355 |
| 4,599,491 | 7/1986 | Serrano .............................. 379/444 |
| 4,607,747 | 8/1986 | Steiner ................................ 40/455 |
| 4,644,107 | 2/1987 | Clowes et al. ....................... 379/354 |
| 4,677,657 | 6/1987 | Nagata et al. ................... 379/357 X |
| 4,723,275 | 2/1988 | Hirth et al. .......................... 379/361 |

FOREIGN PATENT DOCUMENTS 3329307  2/1985  Fed. Rep. of Germany .
2063010  5/1981  United Kingdom ................ 379/357

OTHER PUBLICATIONS

Catalog Flyer, p. 70, Article Entitled "Powerful Auto-Dialer has a Brain for Business".
Newspaper Clipping Entitled "Touch-Tone TV Test Planned by U.S. News" 9-15-1987.
"Hitachi Review" Article Entitled 4 Bit Microcomputer HD61827 for Telephone Subset, 1985.

Primary Examiner—James L. Dwyer
Attorney, Agent, or Firm—Nixon & Vanderhye

[57] ABSTRACT

An automatic telephone number dialing device for use with mass-distribution media products to enable consumers to automatically dial of preprogrammed number associated with one or more sources of goods and/or services. The device may be constructed as an insert for magazines, books, direct mail advertising, or newspapers. The device may also be constructed as a customized service card for accessing sources of products or services. The preprogrammed number may be that of a centralized, automated, or personal telemarketing system. The dialing device includes a single chip microprocessor capable of producing DTMF tones corresponding to the preprogrammed telephone. By passing the tones through a miniature speaker or other sound transducer, the preprogrammed number will be automatically dialed. Related processes of manufacture and use are also disclosed.

28 Claims, 6 Drawing Sheets

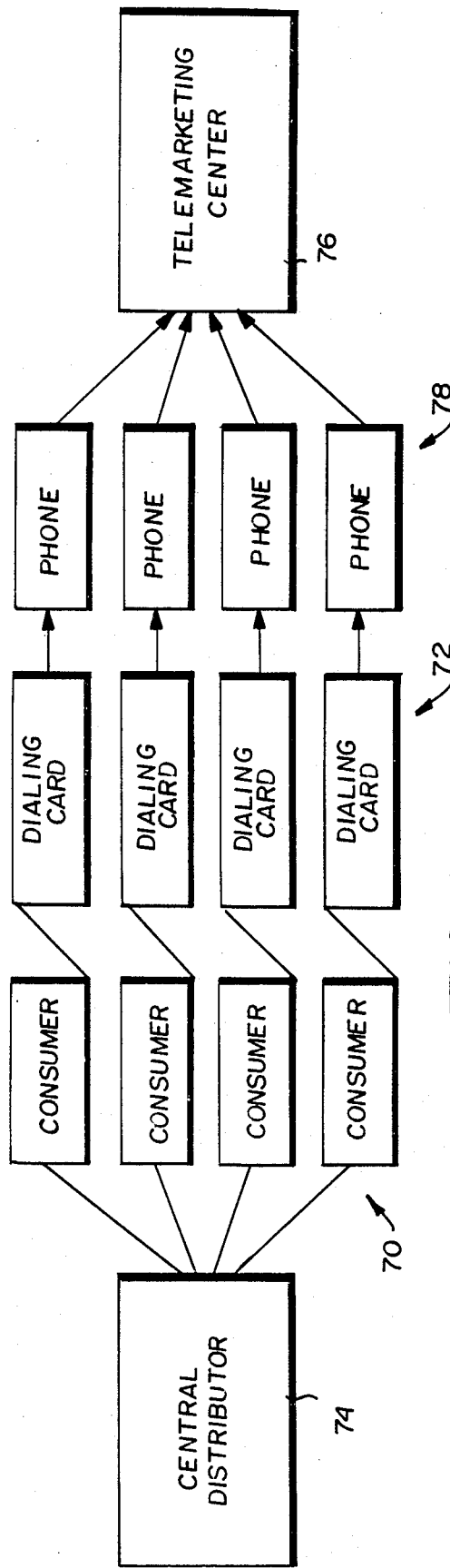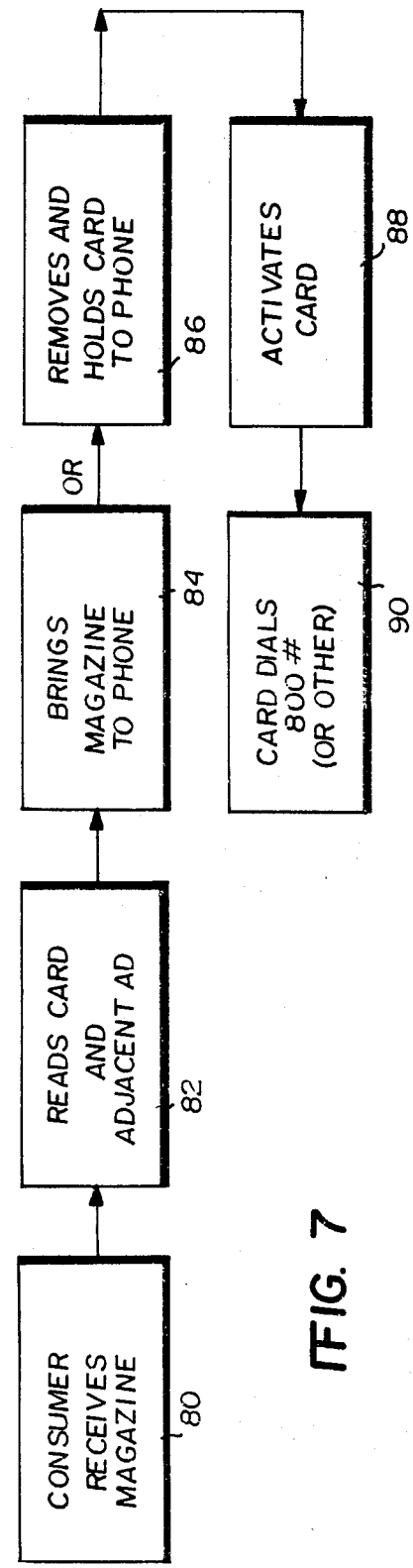

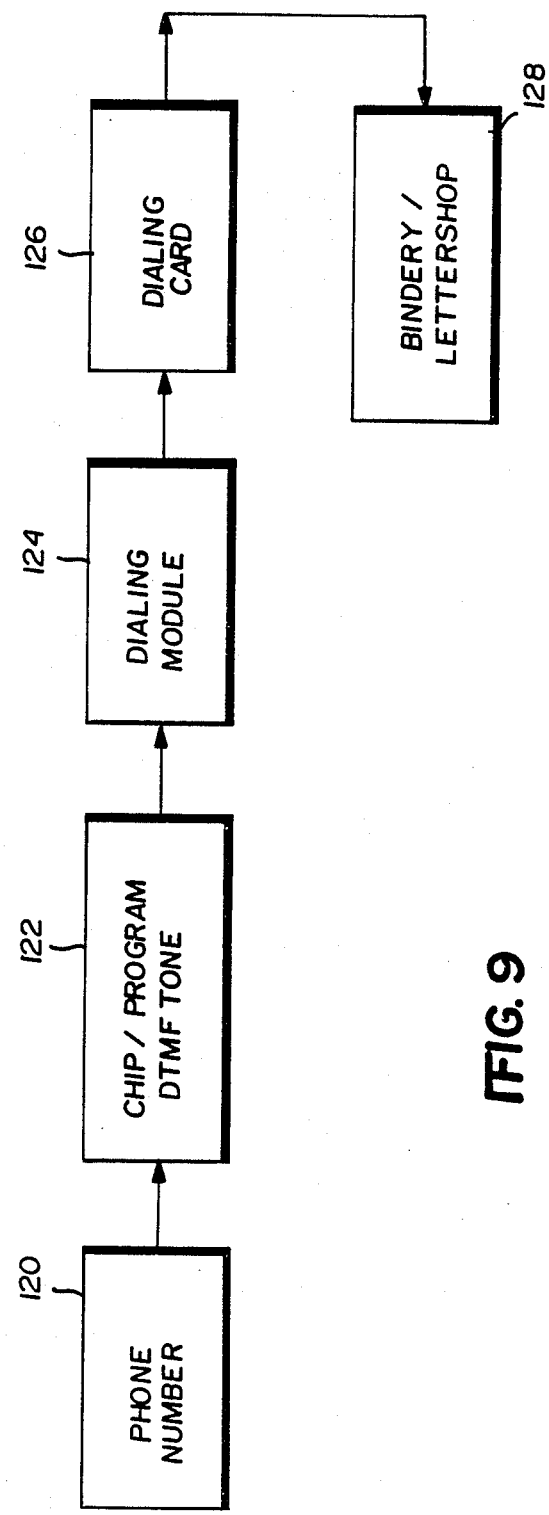

CRT MASS-DISTRIBUTION, PREPROGRAMMED AUTOMATIC DIALING MECHANISM AND RELATED PROCESSES

BACKGROUND AND SUMMARY OF THE INVENTION

This invention relates to an automatic telephone dialing mechanism separably attached to various mass-distributed inert media formats such as books, magazines, newspapers or direct mail packages, or incorporated into customized personal service cards, for connecting a consumer with interactive media such as centralized telemarketing systems and the like.

Various types of telephone related interactive purchasing or other marketing-type systems are known.

For example, in U.S. Pat. No. 4,071,697, there is disclosed a complex interactive purchasing system which enables a user's television to become a shopping terminal. The T.V. antenna receives broadcast signals from a transmitter station including a centralized computer system, and feeds the signals through a controller which continuously modulates and decodes the RF information. From the decoded information, the controller recognizes the address of discrete blocks of information as they are received. The viewer selects the block of information which he wants to see by means of a keyboard provided on the controller. The viewer may also indicate that he/she desires to purchase a particular item displayed on the T.V. by depressing the appropriate keys on the keyboard. The controller then generates DTMF dialing tones corresponding to the telephone number of the store from which the item may be purchased, and feeds the signals to an associated acoustic coupler on which the hand set of the user's telephone rests. In this manner, the telephone number of the appropriate store is automatically dialed.

There as also been some limited utilization of a marketing system involving broadcasting dual tone multi-frequency (DTMF) signals, i.e., the "touch tone" signals heard when dialing a pushbutton telephone, over television and/or radio, thereby allowing consumers to have a predetermined telephone number automatically dialed merely by holding a telephone next to the television or radio speaker. This system has undesirable constraints insofar as the consumer's telephone must be located close to the television and/or radio, and use of the system is limited to the specific broadcast periods. Moreover, technological problems may be created by the simultaneous automatic dialing of a single number by, potentially, thousands of consumers.

There are many other interactive systems involving automatic dialing of telephones. For example, in U.S. Pat. No. 4,456,925, the patentee proposes to integrate a telephone with a standard television receiver so that repertory stored telephone numbers may be recalled for display on the television receiver screen before being automatically dialed.

U.S. Pat. No. 4,490,579, discloses a radio paging receiver having a memory for storing caller's telephone numbers. The pager is also provided with a converter which supplies DTMF tones corresponding to the caller's telephone number, so that with the aid of an amplifier and audio speaker, the caller's number can be recalled from the pager memory and automatically dialed by holding the pager over the microphone of a telephone.

U.S. Pat. No. 4,535,204, discloses optical reading of telephone numbers stored in a barcode format on various types of storage media, followed by automatic dialing of a telephone number after a user passes a reading wand over the proper barcode.

U.S. Pat. No. 4,644,107 discloses an entirely voice controlled telephone dialing system utilizing voice recognition techniques and visual displays.

In U.S. Pat. Nos. 4,107,467 and 4,451,701, systems are disclosed by which users at remote locations can access host computers by telephone.

In accordance with the present invention, mass-distributed (via subscription, direct mail, or retail sales) print or other media is relied upon to distribute mechanisms by which individual consumers, at locations and times of their own choosing, can have automatic access to centralized information systems or other sources of products or services. More specifically, the present invention relates to an automatic telephone dialing mechanism preprogrammed to automatically dial a single telephone number, typically, but not necessarily, a 700, 800 or 900 area code number. The automatic dialing mechanism is intended to be associated with various kinds of inert media, such as magazines (including catalogues), books, newspapers, direct mail packages advertising product and/or services, etc.

Alternatively, the automatic dialing device may be incorporated into customized service cards such as personal business cards, long distance dialing cards (for dialing phone company access or charge numbers), credit cards and the like.

In each case, the invention includes a single microchip preprogrammed to store and recall a specific predetermined telephone number and to produce a corresponding train of DTMF dialing tone signals; a speaker; a battery; and a switch for acutating the device, all of which are mounted on a substrate constructed of relatively stiff but flexible paper, paperboard, plastic or other suitable material.

As will be appreciated, the automatic dialing mechanism can be utilized repetitively, depending only on the life of the battery, which could be made replaceable for certain application if so desired.

The single chip microprocessor includes a tone generator which converts the microprocessor-stored information, i.e., the telephone number, into corresponding DTMF tones which are applied to a speaker or other sound transducer. The switch mechanism, which may be a simple Mylar-type switch conventionally used on melody greeting cards and the like, permits the user to activate the automatic dialer whenever and wherever he/she chooses. Simply by actuating the device and holding it next to the microphone of a telephone, the preprogrammed number is automatically dialed to connect the user with the information, product, service, or other source.

In accordance with one exemplary embodiment of the invention, the automatic dialing mechanism is removably bound into magazines or books, in association with related advertising. For example, a one or two page advertisement for products, services, subscriptions, etc. will include an automatic dialer mounted on a two-ply card attached between the pages of the magazine or book in a manner similar to subscription cards and other "mail-in" type cards. Typically, the card will contain printed matter relating the card to the advertisement, along with instructions on how to use the card. The preprogrammed telephone number will connect the user directly with the company featured in the advertisement, a telemarketing center, or other information source.

In a related aspect, the magazine may be in the form of a catalogue by which the user may order products or services by phone. The present invention permits the user/consumer to directly and quickly access the source, thus eliminating the need for filling out order forms, and mailing delays.

Where the magazine or other media format contains products from a number of sources, the telephone number may connect the user with a telemarketing system which will then further direct the call to the corresponding source. In an alternative mode, the card itself may include a number of extensions, for example, 1 through 10, with each extension corresponding to a particular store or other source. Once connected to the centralized telemarketing system, the user simply provides the appropriate extension number and is then directly connected to the corresponding source.

In another embodiment, the inert media format may be newspapers which include free standing inserts incorporating automatic dialing cards as previously described.

In another exemplary embodiment of the invention, the inert media format may comprise direct mail packages including automatic dialer reply cards of the type described hereinabove, as a substitute for the traditional reply-by-mail type cards.

In still another exemplary embodiment of the invention, customized and/or personalized service cards are constructed so as to incorporate an automatic dialing mechanism preprogrammed with the phone number of a product or service source distributing the card. These are particularly adapted for repetitive use applications, such as long distance telephone dialing, Dial-A-Joke, Dial-A-Prayer, stock quotations, T.V. home shopping networks, credit cards, personal business cards and the like. Additional applications are described further herein.

In each of the above embodiments, the automatic dialing mechanism per se is incorporated into a card-like structure suitable for the particular application. Generally, the card will include a two-ply arrangement with the automatic dialer mechanism mounted between the plies. The card also includes, in a preferred arrangement, a fold-over flap portion which serves to open or close the actuating switch. It will be further understood that the components of the automatic dialer mechanism are miniaturized to the extent of permitting a card dimension on the order of four inches by two inches, or even less, depending on end use requirements. For a magazine or book insert, the card may be formed with an additional tab-like portion which can be inserted through the binding to removably attach the card. A similar arrangement may be used for newspapers, or, alternatively, the card may be attached to a free standing insert by conventional low-tack adhesive.

In related aspects, this invention concerns specific methods by which a user interacts, at the front end, with inert media to directly access an interactive media such as a telemarketing system; and to methods by which the interactive media responds to specific types of calls.

In another related aspect, the invention relates to a method of manufacturing an automatic dialing card device.

In brief summary, the present invention provides, for the first time, an automated link between inert media, consumers, and interactive media, with the significant advantage that response by the user/consumer is simplified to a degree heretofore unattainable in the prior art.

Additional objects and advantages of the subject invention will become apparent from the detailed description which follows, in further conjunction with the accompanying drawings.

BRIEF DESCRIPTION OF THE DRAWINGS

FIG. 6 is a flow chart illustrating an exemplary use for the subject invention;

FIG. 7 is a flow chart illustrating front end user interaction with the subject invention;

FIG. 9 is a flow chart illustrating an exemplary process for manufacturing an automatic dialing mechanism in accordance with the invention.

DETAILED DESCRIPTION OF THE DRAWINGS

Figure 1:
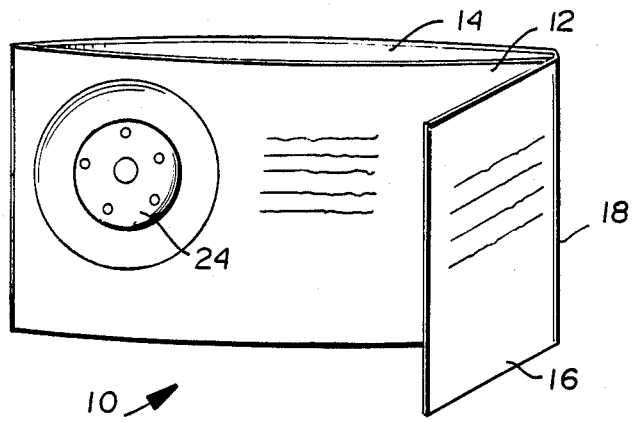
FIG. 1 is a perspective view of an automatic dialing card in accordance with an exemplary embodiment of the invention.
Figure 2:
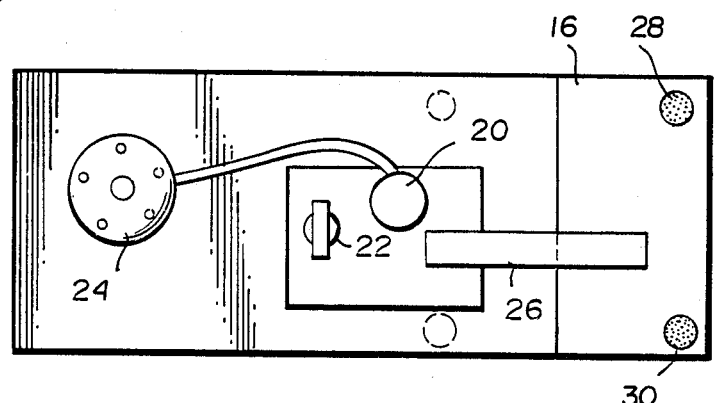
FIG. 2 is a top view of the card illustrated in FIG. 1, with the top or front ply removed.

With reference now to FIGS. 1 and 2, there is shown a substrate or card 10 incorporating an automatic dialing mechanism in accordance with the invention. The card or substrate 10, which is preferably constructed of relatively stiff but flexible paper, paperboard, lightweight cardboard, or other suitable material such as plastic, includes substantially planar front and back plies, 12, 14, respectively. This portion of the card is preferably on the order of four inches long by two inches wide, but may be smaller or larger, and have virtually any peripheral shape depending on end use requirements, user preference, etc.

At one side of the card or substrate, there is provided a fold-over flap portion 16 which is adapted to open or close about a fold line 18. The flap itself may be an extension of one of the plies 12 or 14, with the plies being connected along the fold line 18 by a suitable adhesive or other means. Flap portion 16 may also be separately formed and joined by any suitable means at the fold line 18 if so desired. As will be hereinafter explained in greater detail, a switch device is associated with the flap 16 so that when the flap is opened, the automatic dialer mechanism will be activated to generate the DTMF signals for automatic dialing of the preprogrammed telephone number.

Figure 5:
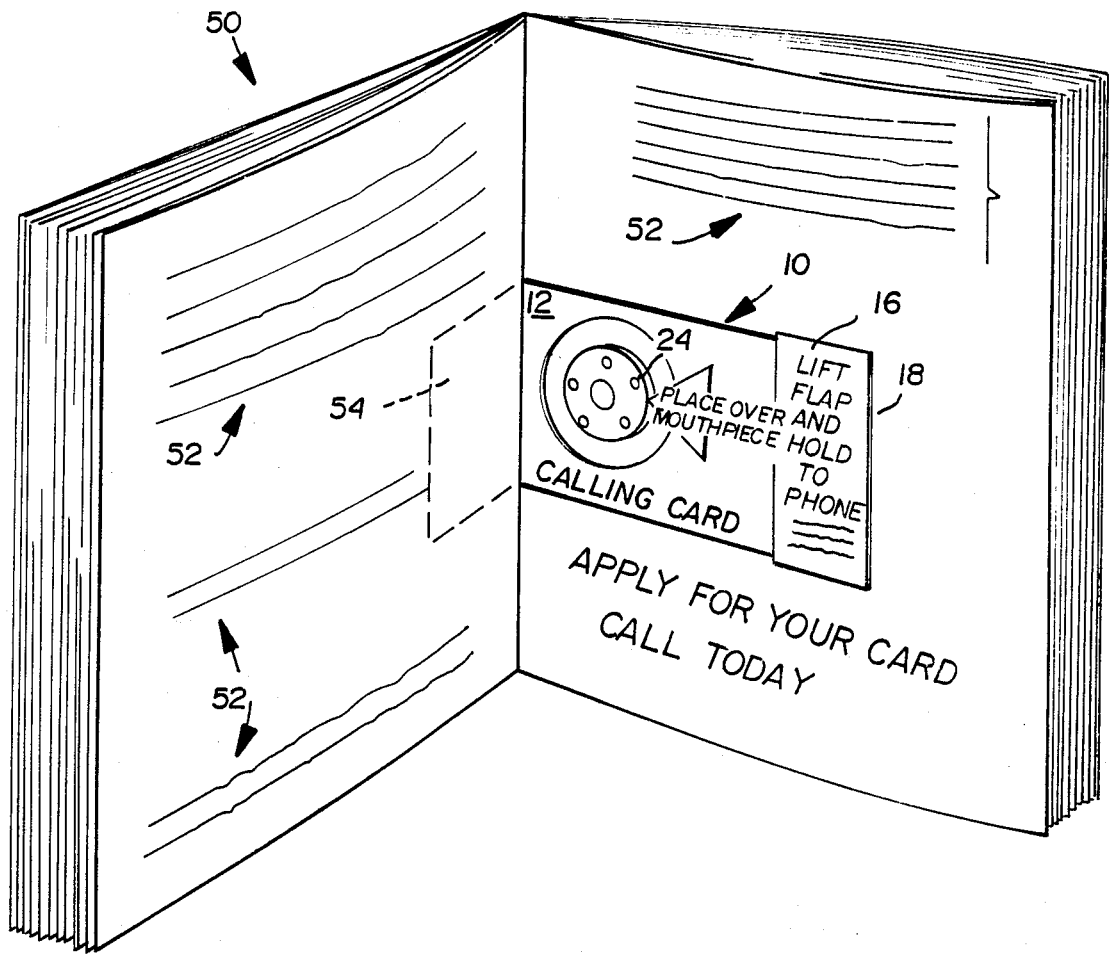
FIG. 5 is a perspective view of another exemplary embodiment of the invention.

With specific reference to FIG. 2, the automatic dialer mechanism includes a single chip microprocessor based DTMF (dual tone multi-frequency) tone generator 20, which may be a 4-bit Microcomputer model HD61827 manufactured by Hitachi, Ltd. of Japan or similar. The substrates 12 and 14 enclose the tone generator chip 20 along with an associated miniature battery (or other power source such as a solar cell) 22 and miniature speaker (or other sound transducer) 24. A conventional Mylar SPST switch 26 serves to actuate the tone generator chip 20 to generate a predetermined desired sequence of DTMF tones upon opening the flap 16. As best seen in FIG. 5, the fold-over flap portion 16 may be provided with one or more "spots" 28, 30 of low-tack, restickable adhesive for holding the flap in the closed position when not in use. This is an important feature which prevents unwanted activation of the device (e.g., during manufacturing, printing, distribution processes) and consequent wearing-down of the battery.

An appropriate time delay may be programmed into the device so that, for example, the tones are not broadcast through the speaker for five seconds after the flap is opened (e.g., thus providing time for the user to get the telephone microphone acoustically coupled to the speaker). The battery (which may be of the conventional low profile type used in watches, for example), the miniature speaker, and the Mylar switch are entirely conventional (except insofar as they are included in the invention as a whole), and as such, need not be described in any further detail.

Figure 3:
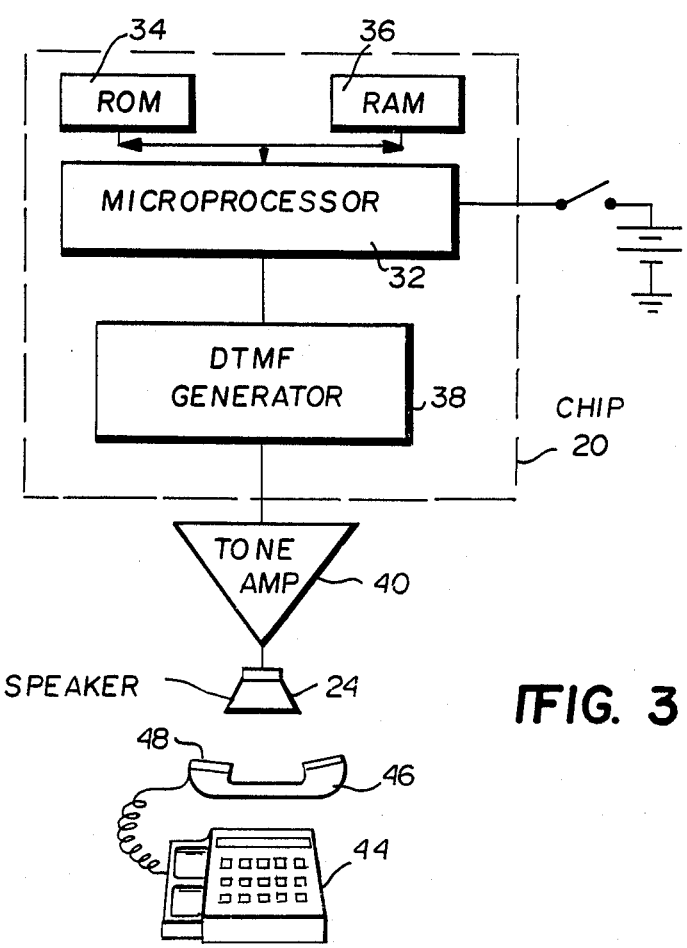
FIG. 3 is a schematic diagram illustrating an automatic dialing mechanism in accordance with the invention, shown in conjunction with a conventional telephone.

With reference now to FIG. 3, it will be appreciated that the tone generator chip 20 includes a microprocessor 32, and appropriately sized read only memory (ROM) 34 and random access memory (RAM) 36. Further details relating to the structure and operation of tone generator chip 20 may be found in "A 4-bit Microcomputer HD61827 for Telephone Subset" published in *Hitachi Review* Volume 34, No. 6 (1985).

The polyphonic Hitachi HD61827 is used in the preferred embodiment because of its small size, low power consumption, programmability and ready availability. However, any miniature low power programmable DTMF tone generator circuit could be used instead. For example, a custom designed VLSI DTMF tone generator circuit which does not include features of the Hitachi chip which are not used in the preferred embodiment (e.g., an LCD display driver) might be used to realize lower cost at high volumes. In addition, a pair of monophonic chips, actuated simultaneously to produce a DTMF tone pair could also be employed.

Also included in tone generator chip 20 is a DTMF generator 38 which decodes a preprogrammed telephone number stored in ROM 34 (under control of program control software stored in ROM 34) and generates a sequence of corresponding DTMF tones which are fed to a conventional low power audio amplifier 40. Amplifier 40 (which may not be necessary if the direct output of DTMF generator 38 has sufficient amplitude) amplifies the tone signals produced by DTMF generator chip 38 to a level sufficient to drive speaker 24. Speaker 24 converts the amplified tone signals to DTMF acoustic signals which are acoustically coupled (through the air) to a conventional telephone 44 placed in proximity to the speaker. Telephone 44 includes a handset 46 provided with a microphone 48 which is positioned to receive the tones produced by the DTMF generator 38 and thereby effect automatic dialing of the preprogrammed telephone number.

Figure 4:
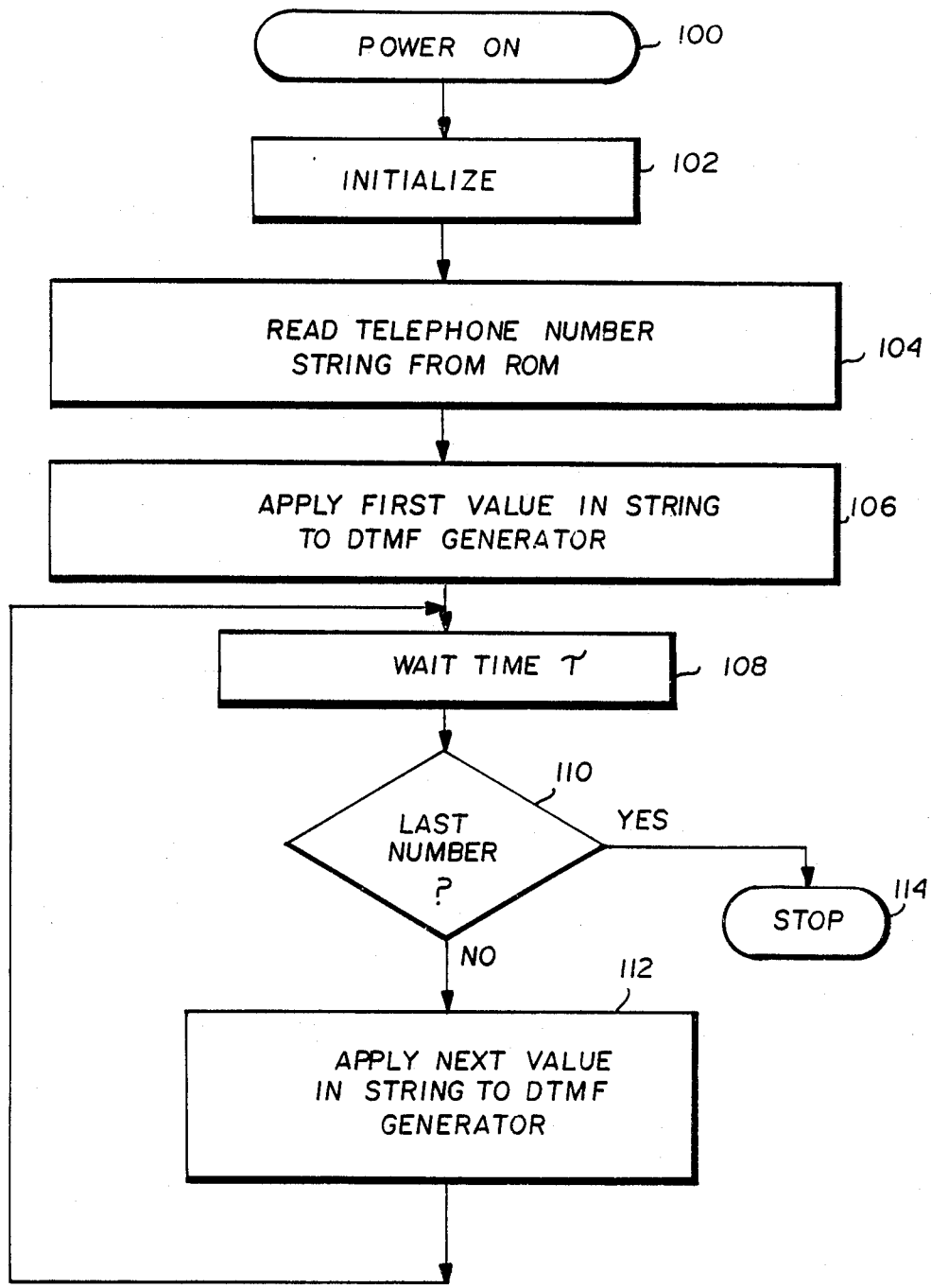
FIG. 4 is a flow diagram illustrating the operation of a microprocessor in an automatic dialing mechanism in accordance with the invention.

FIG. 4 is a flowchart of exemplary program control steps performed by microprocessor 32 to effect dialing of the preprogrammed telephone number in response to the operation of switch 26.

In the preferred embodiment, switch 26 connects battery 22 to chip 20 in order to conserve battery power during periods when the chip is not operating, and the routine shown in FIG. 4 is executed whenever power is applied to the chip. However, it is also possible to have chip 20 connected at all times to battery 22 and connect switch 26 to a reset pin on the chip (since the Hitachi HD61827 or similar may draw as little as 2 microamps while operating in the "stop" or "sleep" mode).

When switch 26 is actuated (e.g., by opening flap 16, FIG. 4 block 100), microprocessor 32 begins executing program control instructions stored in ROM 34. The first instructions executed by microprocessor 32 initialize internal registers, timers and the like in a conventional manner (block 102, FIG. 4). Microprocessor 32 then reads data representing a telephone number (actually a sequence of different values in the range of 0 through 9) stored in ROM 34 (for example, 1-800-123-4567) at block 104 and applies the first value in the string to DTMF generator 38 (block 106). DTMF generator 38 produces the DTMF tone pair corresponding to the first value for a time period controlled by microprocessor 32 (block 108) and subsequently ceases to produce the tone pair. The duration of the tone pair produced by DTMF generator 38 should be sufficient to enable the telephone company switch tone decoders to properly detect and decode the tone pair.

Microprocessor 32 then determines whether the tone pair just produced was for the last value in the telephone number sequence (decision block 110). If the last value in the telephone number sequence has not yet been encoded into DTMF tones by generator 38, microprocessor 32 applies the next value in the telephone number sequence to DTMF generator 38—causing the generator to produce a further DTMF tone pair corresponding to this next value (block 112). This process continues until the last value in the telephone number sequence has been encoded into DTMF tones (tested for by decision block 110), at which time tones corresponding to the entire predetermined telephone number will have been produced by speaker 24 and acoustically coupled to the telephone line via handset microphone 48. When the last value in the string has been encoded into DTMF tones, microprocessor 32 executes a "stop" (or similar) instruction (block 114)—which causes chip 20 to enter the "sleep" mode in order to reduce power consumption.

The user may control chip 20 to redial the preprogrammed number (for example, if a busy signal was received or if insufficient acoustical coupling existed between speaker 24 and handset microphone 40) by closing flap 16 and opening it once again. This action causes the FIG. 4 routine to execute all over again.

It will be understood that the automatic dialing card device as illustrated in FIG. 1 includes the basic or common structural aspects for all embodiments of the invention. In other words, the FIG. 1 embodiment represents a dialing card which can be modified slightly (as further described and shown with reference to FIG. 5) to serve as an insert for books, magazines, newspapers, direct mail packages, etc., and it also represents a dialing card in the form of a customized personal service card as further described herein.

FIG. 5 illustrates an exemplary embodiment of the invention wherein the card 10 is shown in the form of an insert for a news or other magazine (including the catalogue type) or book 50. In the case of a magazine, the adjacent pages will typically include advertising indicia, indicated by reference numeral 52, related to a source of products, services, or the like, and including an invitation to the consumer to call, using the accompanying card. To facilitate attachment of the card, an additional flap 54 is provided which is slipped through the binding of the magazine in a conventional manner. The magazine (or book) page or pages, as well as the card itself, will also typically include instructions on how to use the automatic dialing card. This arrangement allows the consumer to remove the card and to use it at the time and place of his/her own choosing. By providing advertising indicia as well as instructions on the card itself, the consumer need not retain the magazine per se in order to use the card.

The magazine 50 may be in the form of a shopper's catalogue, or the like, with the card 10 intended to be used to place purchase orders for various items illustrated in the catalogue. The repetitive capability of the card is especially useful in such applications.

For magazines (or other inert media format) advertising items from a single source, the preprogrammed telephone number connects the consumer with a single store, purchasing center or the like. However, where the magazine (or other inert media format) contains items from a plurality of sources, the card 10 will preferably indicate a number of possible extensions, one for each of the product sources. Thus, upon connection with a central purchase order information system, the user merely conveys the appropriate extension, enabling direct connection to the corresponding source.

For direct mail and newspaper applications, the automatic dialing mechanism may be incorporated in a card-like structure shown in FIGS. 1 or 5, depending on advertiser preference, and the configuration of the printed advertising associated therewith.

In still another exemplary embodiment of the invention the two-ply card 10, substantially as shown in FIG. 1, or as shown in FIG. 5 but without the mounting flap 54, may be configured as a customized service card, such as a personal business card incorporating an automatic dialing mechanism as previously described. In this application of the invention, the preprogrammed number will correspond to the home or office number of the distributor of the card. This configuration is particularly advantageous in that the holder of the card need not look up, or remember, the number of the person or business from which the card originates.

Other related applications include customized service cards for accessing clubs and other organizations which profit from repetitive phone calls to 700, 800 or 900 numbers; T.V. home shopping networks (enabling the consumer to purchase a particular item displayed on the T.V. screen); medical information banks; financial or brokerage institutions; retail outlets; political campaign centers; subscription services; community service "bulletin boards"; news and sports updating services; long distance dialing cards; and credit cards.

For any or all of such customized service card applications, it is preferred to construct the card of durable plastic material to insure the long life of the card, particularly since these cards are designed for repeated use.

With reference to FIG. 6, an exemplary distribution flow chart illustrates the concept of the invention and, particularly, the manner by which a plurality of consumers 70 are provided with automatic dialing cards 72 through the mass distribution of magazines (including catalogues), books, and newspapers (whether by subscriptions or by retail sales of the same) or direct mail packages from a central distributor 74. With such mass distribution techniques, many consumers (obviously many more than indicated in FIG. 7) are each provided with an automatic telephone dialing card permitting direct access to, for example, a common telemarketing center 76 through their own, or other, telephones 78. Stated quite simply, the described inert media formats may be directly linked to an interactive media such as a centralized telemarketing or other information or referral system, by means of the automatic dialing card described herein.

The significant advantages of the system illustrated in FIG. 6 are ease of response by the consumer, along with the freedom to activate the card at the time and location of his/her choice, merely by holding the card to the microphone of a telephone.

FIG. 7 is an exemplary flow chart which illustrates in greater detail the "front-end" interaction of a consumer. Initially, the consumer receives a magazine or other mass-distributed, inert media product which includes advertising and other product or service information in print, along with an automatic dialing card (block 80). During the course of reading the magazine, the consumer will read the advertisement and related information concerning the use of the card (block 82). If the consumer desires to make immediate use of the card, he/she can then bring the magazine into close proximity with a phone hand set (block 84), or first remove the card from the magazine and hold the card next to the phone hand set (block 86). By then opening the flap associated with the automatic dialing device, the card is activated (block 88) to automatically dial, for example, a 700, 800 or 900 number preprogrammed into the device (block 90). In this manner, the consumer interacts quickly and directly with the telemarketing or other system using touch tone and voice communication.

While the process of using the card has been described primarily with respect to a telemarketing system (automated or otherwise), the preprogrammed telephone may connect the user with any of several sources related to the various card applications as already described.

Figure 8:
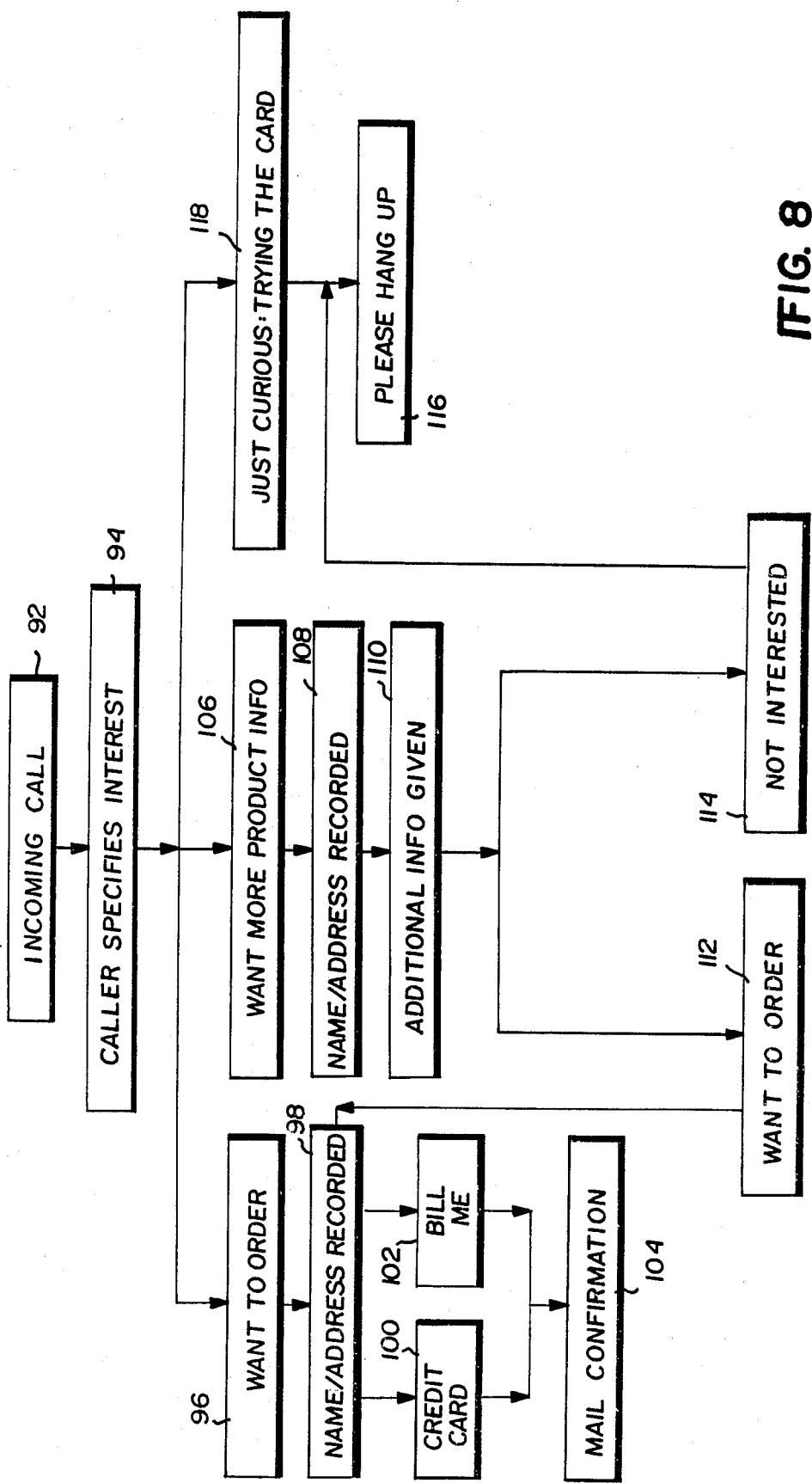
FIG. 8 is a flow chart illustrating back end interaction with a telemarketing system in accordance with an exemplary embodiment of the invention.

FIG. 8 illustrates, in exemplary form, a "back-end" interaction system wherein a conventional telemarketing system (which may use a conventional live operator system or computer driven system utilizing electronic voice techniques), receives an incoming call from a consumer (block 92) and directs the caller, as appropriate, depending on caller interest (block 94). For example, a caller may wish to order a particular product or service brought to his/her attention by a specific inert media format (block 96). In this case, further information is recorded relating to the item to be ordered, consumer name and address (block 98) and method of payment (blocks 100, 102). The order may then be confirmed by mail (block 104). Other callers may merely want more product information (block 106), in which case such additional information is provided(block 110) after having recorded the consumer's name and address (block 108) and subsequently, a determination is made by the consumer whether or not to make a purchase (blocks 112, 114). If not interested, the caller is advised to immediately hang up (block 116) and thus conserve unnecessary telephone use time charges. A third category might be consumers who are merely trying the card out of curiosity (block 118), and in order to conserve on-line time, these callers are also encouraged to hang up (block 116). It is to be understood that the back-end system described may be fully automated with current state-of-the-art communication systems, or it may be done using a traditional live operator system.

With reference now to FIG. 9, an exemplary flow chart illustrates, broadly, one manufacturing process for making automatic dialing cards in accordance with the present invention. Initially, a specific telephone number is provided by a phone company (block 120) and programmed into the microprocessor chip (block 122). The chip is then integrated into a durable dialing module or mechanism, including speaker, battery, Mylar on/off switch or other suitable actuation device (block 124).

Subsequently, the dialing module is incorporated into a two-ply card on which instructions for use and advertiser's message is printed, if applicable, depending on the type of card being made (block 126). In one exemplary embodiment, the dialing card is then removably bound into a magazine or other inert media product as previously described, at a bindery or lettershop (block 128). The inert media product with automatic dialing card is then ready mass distribution and for subsequent reception by individual users and/or consumers.

In order to reduce costs, it is possible to manufacture a chip preprogrammed with a single telephone number which may nevertheless connect consumers with any one of, for example, ten or more sources. This is accomplished, as mentioned above, by additional use of extension numbers, specific to a single source (and thus included in related advertising) and supplied by the user when connected to the central telemarketing or other information referral service.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A pocket size automatic dialing device comprising:
   a portable card provided with information related to goods or services;
   automatic telephone dialing means mounted on said card, said automatic dialing means capable of producing DTMF tones corresponding only to a single programmed telephone number for connecting a user directly with a source of said goods or services;
   a power source for supplying power to said automatic telephone dialing means;
   means for acoustically coupling said automatic dialing means to a telephone microphone; and
   a single switch mounted on said card for supplying power from said power source to said automatic telephone dialing means for dialing said preprogrammed telephone number.

2. A device as defined in claim 1 wherein said card includes means for removably attaching said device to inert media means.

3. A device as defined in claim 2 wherein said inert media means comprises magazines or books.

4. A device as defined in claim 2 wherein said inert media means comprises direct mail packages from a product or service source.

5. A device as defined in claim 2 wherein said inert media means comprises newspapers.

6. A device as defined in claim 1 wherein said switch means includes a fold-over flap portion of said substrate means.

7. A device as defined in claim 1 wherein said automatic telephone dialing means comprises a microprocessor.

8. A device as defined in claim 7 wherein said microprocessor comprises a single chip microprocessor with an on-chip DTMF tone generator.

9. A device as defined in claim 8 and further wherein said means for acoustically coupling said automatic dialing means to a telephone microphone comprises a speaker.

10. A device as defined in claim 1 wherein said automatic dialing means comprises a single polyphonic microprocessor chip.

11. A device as defined in claim 1 wherein said automatic dialing means comprises at least a pair of monophonic chips which can be actuated to produce two tones substantially simultaneously.

12. A portable communications device acoustically coupleable to a telephone microphone for linking inert and interactive media comprising:
    a flexible substrate,
    a microprocessor mounted on said substrte and having a memory sufficient to store at least one telephone number;
    means mounted on said substrate capable of generating dual tone multi-frequency signals corresponding only to a preprogrammed telephone number;
    means for detachably mounting said device to inert media means including advertising for a product or service source, said inert media means adapted for mass distribution; and
    switch means mounted on said substrate for activating said microprocessor and said generating means to generate said signals, such that, when said generating means is activated, and when said portable device is plated adjacent a telephone microphone, the preprogrammed telephone number is automatically dialed to connect the user directly with interactive media means at the source of said product or service.

13. A device as defined in claim 12 wherein said inert media means comprise magazines or books.

14. A device as defined in claim 12 wherein said inert media means comprise direct mail packages from said source.

15. A device as defined in claim 12 wherein said inert media means comprise newspapers.

16. A device as defined in claim 12 wherein said flexible substrate comprises two layers of material, and wherein said microprocessor and said generating means are substantially enclosed by said two layers.

17. A device as defined in claim 16 wherein said switch means comprises a fold-over flap portion located at one end of said, multi-layer substrate.

18. A device as defined in claim 17 wherein said substrate further includes a tab portion insertable through a binding portion of a magazine or book, said tab portion located at an end of said substrate remote from said one end.

19. A marketing system combining mass-distributed inert print media and a centralized interactive marketing media comprising:
    (a) a plurality of print media means adapted for mass-distribution to individual consumers;
    (b) a preprogrammed automatic telephone dialing device detachably mounted to each said print media means for automatically dialing a telephone number for the centralized interactive media said device further including switch means for actuating said automatic telephone dialing device; and (c) centralized interactive marketing media means for receiving consumer calls generated by said automatic telephone dialing devices.

20. A system as defined in claim 19 wherein said centralized interactive media comprises a telemarketing system for receiving individual telephone calls from consumers.

21. A system as defined in claim 20 wherein said telemarketing system includes means for further directing calls from the consumers to one of a plurality of predetermined product or service sources.

22. A system as defined in claim 19 wherein said automatic dialing device comprises a single chip microprocessor with an on-chip DTMF tone generator.

23. A direct marketing system including front end interaction between inert media means, individual consumers, and a telemarketing system, and back end interaction between the telemarketing system and selected sources of products or services, comprising:

mass-distributed inert media means, each of said inert media means including one or more removable substrates, each said substrate having incorporated therein an automatic telephone number dialing device;

said substrate and said inert media means having advertising material associated therewith relating to goods or services from a source; said automatic telephone number dialing device including means for generating DTMF tones corresponding to a preprogrammed telephone number; and actuation means for actuating said automatic telephone number dialing means enabling individual consumers to access the telemarketing system.

24. A system as defined in claim 23 wherein said preprogrammed telephone number is associated with a plurality of said sources, said telemarketing system including means for selectively connecting consumers with any one of said plurality of sources.

25. A system as defined in claim 23 wherein said inert media means comprises magazines and books.

26. A system as defined in claim 23 wherein said inert media means comprise newspapers.

27. A system as defined in claim 23 wherein said inert media means comprises direct mail packages from one or more of said selected sources.

28. A system as defined in claim 23 wherein said inert media means comprise service cards for accessing one or more of said selected sources.

* * * * *

UNITED STATES PATENT AND TRADEMARK OFFICE
CERTIFICATE OF CORRECTION

PATENT NO. : 4,817,135

DATED : March 28, 1989

INVENTOR(S) : WINEBAUM

It is certified that error appears in the above-identified patent and that said Letters Patent is hereby corrected as shown below:

Change title to read --MASS-DISTRIBUTION AUTOMATIC DIALING MECHANISM AND RELATED PROCESSES--.

Signed and Sealed this

Nineteenth Day of June, 1990

Attest:

HARRY F. MANBECK, JR.

*Attesting Officer*      *Commissioner of Patents and Trademarks*